(12) United States Patent
Gotzig et al.

(10) Patent No.: US 8,701,414 B2
(45) Date of Patent: Apr. 22, 2014

(54) INJECTION DEVICE FOR COMBUSTION CHAMBERS OF LIQUID-FUELED ROCKET ENGINES

(75) Inventors: Ulrich Gotzig, Bad Friedrichshall (DE); Dieter May, Hardthausen (DE)

(73) Assignee: Eads Space Transportation GmbH, Bremen (DE)

( * ) Notice: Subject to any disclaimer, the term of this patent is extended or adjusted under 35 U.S.C. 154(b) by 325 days.

(21) Appl. No.: 12/823,326

(22) Filed: Jun. 25, 2010

(65) Prior Publication Data

US 2010/0264240 A1    Oct. 21, 2010

Related U.S. Application Data

(63) Continuation of application No. 11/438,335, filed on May 23, 2006, now Pat. No. 7,762,071.

(30) Foreign Application Priority Data

May 25, 2005  (DE) .......... 10 2005 024 608

(51) Int. Cl.
*F02K 9/44* (2006.01)

(52) U.S. Cl.
USPC ................ 60/742; 60/211; 60/740

(58) Field of Classification Search
USPC ............ 60/776, 740, 742, 757–758, 211
See application file for complete search history.

(56) References Cited

U.S. PATENT DOCUMENTS

| | | | | |
|---|---|---|---|---|
| 2,617,362 A * | 11/1952 | Parsons | ............ | 418/45 |
| 3,200,589 A | 8/1965 | Mower et al. | | |
| 3,279,190 A | 10/1966 | Shiley | | |
| 3,603,092 A * | 9/1971 | Paine et al. | ............ | 60/258 |
| 4,722,181 A * | 2/1988 | Yu | ............ | 60/776 |
| 5,172,548 A | 12/1992 | Dubedout et al. | | |
| 5,368,230 A * | 11/1994 | Oppenberg | ............ | 239/132.5 |
| 5,423,173 A * | 6/1995 | Lemon et al. | ............ | 60/776 |
| 5,771,579 A | 6/1998 | Farhangi et al. | | |
| 6,640,547 B2 * | 11/2003 | Leahy, Jr. | ............ | 60/752 |
| 6,918,243 B2 | 7/2005 | Fisher | | |
| 7,293,402 B2 * | 11/2007 | Mueller et al. | ............ | 60/258 |
| 2006/0090453 A1 | 5/2006 | Mueller et al. | | |

FOREIGN PATENT DOCUMENTS

FR    2861810    5/2005

OTHER PUBLICATIONS

Sutton et al., "Rocket Propulsion Elements, 7$^{th}$ Ed.", 2001, pp. 270-281.

* cited by examiner

*Primary Examiner* — Andrew Nguyen
(74) *Attorney, Agent, or Firm* — Greenblum & Bernstein, P.L.C.

(57) ABSTRACT

An injection device including at least one injection plate adjacent a combustion space of a combustion chamber, and at least one first injection nozzle including a first entry bore having a first discharge into the combustion chamber, and a first orifice bore, having a cross-sectional dimension less than or equal to the first entry bore, coaxially arranged with the first entry bore and remote from the first discharge. At least one second injection nozzle includes a second entry bore having a second discharge into the combustion chamber, and a second orifice bore, having a cross-sectional dimension less than or equal to the second entry bore, coaxially arranged with the second entry bore and remote from the second discharge. The instant abstract is neither intended to define the invention disclosed in this specification nor intended to limit the scope of the invention in any way.

12 Claims, 1 Drawing Sheet

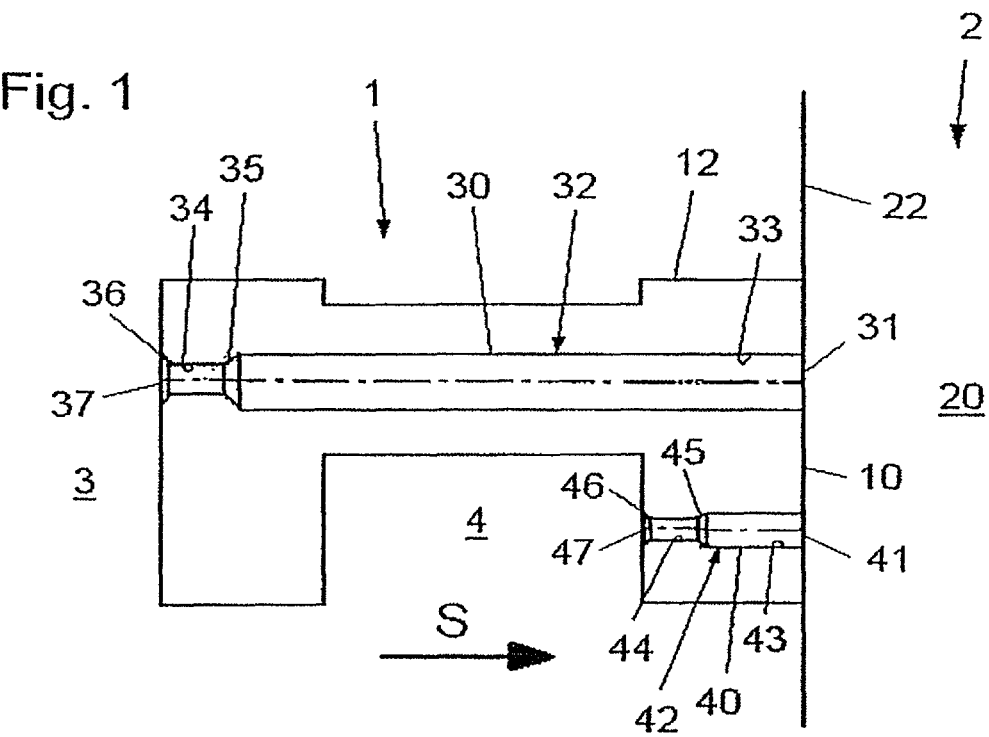
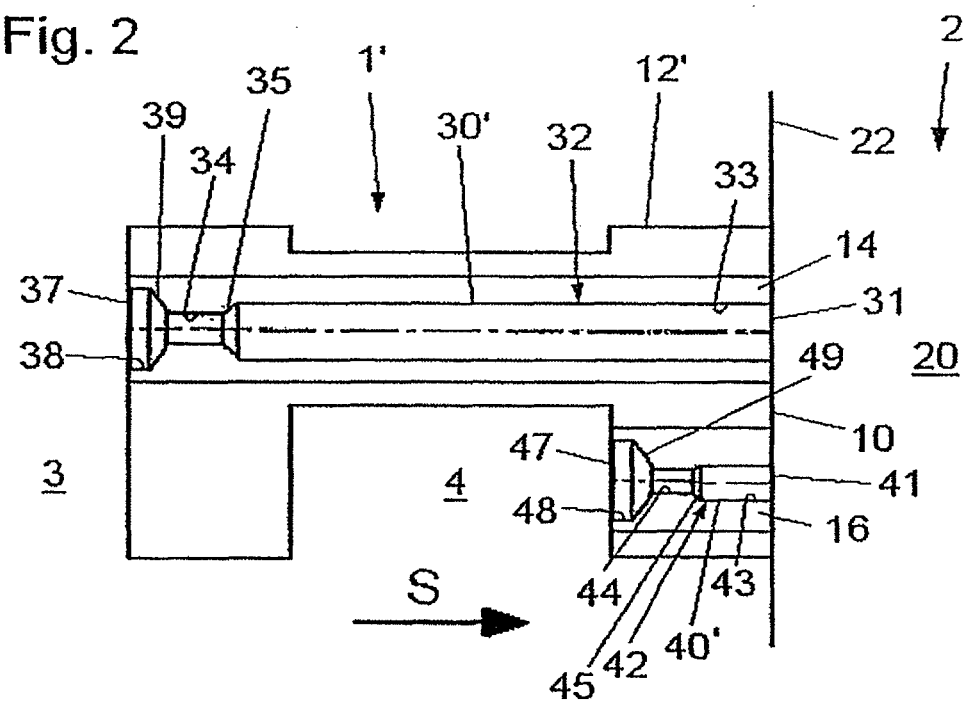

INJECTION DEVICE FOR COMBUSTION CHAMBERS OF LIQUID-FUELED ROCKET ENGINES

CROSS-REFERENCE TO RELATED APPLICATIONS

The present application is a Continuation of U.S. application Ser. No. 11/438,335 filed May 23, 2006, which claims priority under 35 U.S.C. §119 of German Patent Application No. 10 2005 024 608.7, filed on May 25, 2005. Moreover, the disclosures of U.S. application Ser. No. 11/438,335 and of German Patent Application No. 10 2005 024 608.7 are expressly incorporated by reference herein in their entireties.

BACKGROUND OF THE INVENTION

1. Field of the Invention

The invention relates to an injection device for combustion chambers of liquid-fueled rocket engines including an injection plate adjacent to the combustion space of the combustion chamber, at least one first injection nozzle for a first fuel component, and at least one second injection nozzle for a second fuel component.

2. Discussion of Background Information

The function of an injection device of a rocket engine is to guarantee a complete combustion of the fuel with low combustion-chamber volume by good mixture preparation, to ensure a homogeneous combustion gas mixture, a high combustion stability and the lowest possible injection pressure losses. Furthermore, an inadmissible high heat input at the walls of combustion chamber and engine nozzle should be avoided. The production costs should be as low as possible.

Different types of injection heads for liquid-fueled rocket engines are known from George P. Sutton, Oscar Biblarz, Rocket Propulsion Elements, 7$^{th}$ Edition, pp. 271 through 276, including those that work according to coaxial, turbulent or impact jet injection methods. These types of injection heads have the disadvantage that fuel strands can form in the combustion chamber, in which strands either a rich combustion prevails through an excess of fuel or a lean combustion prevails through an excess of oxidizer. Such strand formation impairs the burn-out degree (i.e., the efficiency factor of the combustion). Lean strands can lead to hot-gas corrosion or to localized excessive temperatures (e.g., "hot spots" on the combustion chamber wall) and possibly result in the destruction of the combustion chamber. Strands with fuel excess, if it is a thermally degradable fuel, can lead to local pressure peaks that can cause high-frequency combustion instabilities.

With injection systems that work according to the impact jet injection method or the turbulent jet injection method, the impulse exchange of the two fuel components occurs through direct collision of the corresponding fuel strands.

Injection heads are also known that work according to the parallel jet showerhead injection method. In such injection heads, the two fuel components are injected into the combustion chamber parallel to one another. Parallel jet showerhead injection methods produce a strand-free uniform mixture formation of oxidizer and fuel both in the axial direction (i.e., in the direction of the flow of the combustion gases) and in the radial direction (i.e., transverse to the axial direction). Arrangements are known in which the injection bores for fuel or oxidizer are arranged alternately in a checkerboard shape, in a circular shape, or in a honeycomb shape. A radial speed component, which is necessary for mixing the two fuel components, can be formed in four different ways. The injected fuel component can break down into individual drops. Depending on the viscosity of the fuel component, shear forces and turbulences occurring on the liquid surface can produce a movement of individual fuel drops transverse to the injection direction. Turbulences also occur through the starting combustion that can move the fuel component transverse to the injection direction. Additionally, the fuel component that is injected into the combustion chamber at a higher speed exerts an ejector effect on the other fuel component, whereby an acceleration is exerted on the other fuel component transverse to the injection direction due to the suction effect associated therewith.

Such known injection devices for combustion chambers of liquid-fueled rocket engines have different disadvantages due to their respective systems. The impact jet injection devices cause an asymmetrical temperature distribution, so that a very precise manufacture is necessary. Moreover, with impact jet injection devices, the output of the engine is greatly dependent on the mixing ratio of the two fuel components. Turbulent injection systems necessitate a high injection head pressure loss. Furthermore, it is disadvantageous when the fuel components mix on the wall of the combustion chamber, leading to a high thermal load of the combustion chamber wall. Showerhead injection devices require a large combustion chamber and have a low output and a poor thermal stability.

SUMMARY OF THE INVENTION

The present invention addresses these drawbacks with an injection device for combustion chambers of liquid-fueled rocket engines that, with low hydraulic pressure loss, provides a stable operation and a uniform temperature and power distribution over a wide operating range.

According to implementations of the invention, an injection device for combustion chambers of liquid-fueled rocket engines is created with at least one injection plate adjacent to the combustion space of the combustion chamber, at least one first injection nozzle for a first fuel component and at least one second injection nozzle for a second fuel component. Each of the first and second injection nozzles has an entry bore discharging into the combustion chamber. At its end opposite from the discharge, each entry bore changes into an orifice bore running coaxially with the entry bore. Each respective orifice bore has a cross section that is equal to or smaller than the cross section of its associated entry bore.

Embodiments of the injection nozzles according to the invention provide that the "generating a pressure drop" and "providing an optimized geometry for controlled jet disintegration" functions necessary for the optimal injection of a fuel component are decoupled from one another. The preferably smaller cross section of the orifice bore, which is disposed opposite from the discharge of the injection nozzle into the combustion chamber, generates a pressure drop that hydraulically decouples the combustion chamber and the conveyor system that is located upstream of the injection device. An additional pressure recovery is obtained through the entry bore on the combustion chamber side that is larger in cross section. The cross section of the entry bore determines the jet entry speed of the respective fuel component into the combustion chamber. Through the selection of cross sections of different sizes for the entry bores of the respective fuel components, the type of decomposition and decomposition lengths of the two fuel components can be ideally coordinated.

In using an injection device according to the invention, it is possible to hydraulically decouple the combustion chamber from the conveyor system for the fuel components. In tests conducted by the assignee of the present invention, stable operating conditions up to entry pressures of under 10 bar have been achieved.

Preferably, the first and the second injection nozzle are aligned parallel to one another and arranged adjacent to one another.

On the side of the orifice bore facing away from (e.g., opposite) the combustion chamber, the first and/or second injection nozzle preferably has an intake bore (e.g., comprising a chamfer portion, or comprising a cylindrical discharge bore section and a conical bore section) coaxial to the orifice bore. The cross section of the intake bore is greater than the cross section of the orifice bore associated therewith. This arrangement of the inlet of the conveyor system for the fuel components into the respective orifice bore may include a funnel-shaped transition from the intake bore to the orifice bore. This arrangement prevents jet detachments, cavitation, and supercavitation in the subsequent bores. This intake bore may also be composed of a chamfer in the area of the discharge of the orifice bore into the corresponding fuel conveyor channel.

In a preferred embodiment of the injection device according to the invention, the first and/or second injection nozzle has or have at least one tube in which the entry bore and/or the orifice bore is provided.

In embodiments, the entry bores and/or orifice bores are formed by a channel with a preferably circular cross section. It is understood that the term "bore" in this application is not restricted to openings with circular cross section, and that other openings with cross sections of different shapes are also contemplated by the invention.

According to a first aspect of the invention, there is an injection device, comprising at least one injection plate adjacent to a combustion space of a combustion chamber. The injection device comprises at least one first injection nozzle including a first entry bore having a first discharge into the combustion chamber, and a first orifice bore, having a cross-sectional dimension less than or equal to that of the first entry bore, coaxially arranged with the first entry bore and remote from the first discharge. The injection device comprises at least one second injection nozzle including a second entry bore having a second discharge into the combustion chamber, and a second orifice bore, having a cross-sectional dimension less than or equal to that of the second entry bore, coaxially arranged with the second entry bore and remote from the second discharge.

The at least one first injection nozzle and the at least one second injection nozzle may be arranged parallel and adjacent to one another.

The at least one first injection nozzle may further comprise a first intake bore adjacent the first orifice bore, the first intake bore being coaxial with the first orifice bore and having a cross-sectional dimension greater than the first orifice bore. The at least one second injection nozzle may further comprise a second intake bore adjacent the second orifice bore, the second intake bore being coaxial with the second orifice bore and having a cross-sectional dimension greater than the second orifice bore.

The at least one of the at least one first injection nozzle may further comprise a first tube in which at least one of the first entry bore and first orifice bore are arranged. The at least one second injection nozzle may further comprise a second tube in which at least one of the second entry bore and second orifice bore are arranged.

At least one of the first entry bore and the first orifice bore may be composed of a channel with a substantially circular cross section. At least one of the second entry bore and the second orifice bore may be composed of an other channel with a substantially circular cross section.

The injection device may be structured and arranged for combustion chambers of liquid-fueled rocket engines, wherein the at least one first injection nozzle is arranged to carry a first fuel component and the at least one second injection nozzle is arranged to carry a second fuel component.

The first intake bore may comprise a chamfer adjacent the first orifice bore. The first intake bore may comprise a bore section and a conical section adjacent the first orifice bore.

According to a second aspect of the invention, there is an injection device for a combustion chamber of a liquid-fueled engine, comprising a first bore structured and arranged to convey a first fuel component from a first conveyor channel to the combustion chamber while hydraulically decoupling the first conveyor channel from the combustion chamber. The injection device comprises a second bore structured and arranged to convey a second fuel component from a second conveyor channel to the combustion chamber while hydraulically decoupling the second conveyor channel from the combustion chamber.

The first bore may be arranged substantially parallel and adjacent to the second bore.

The first bore may comprise a first converging portion adjacent a first diverging portion and remote from a first discharge into the combustion chamber. The second bore may comprise a second converging portion adjacent a second diverging portion and remote from a second discharge into the combustion chamber.

The first converging portion may comprise a first chamfer and a first orifice bore; and the second converging portion may comprise a second chamfer and a second orifice bore.

The first converging portion may comprise a first bore section, a first conical section, and a first orifice bore, and the second converging portion may comprise a second bore section, a second conical section, and a second orifice bore.

According to a third aspect of the invention, there is a method of injecting, comprising: supplying a first fuel component through a first bore formed between a first conveyor channel and a combustion chamber, the first bore hydraulically decoupling the combustion chamber from the first conveyor channel; and supplying a second fuel component through a second bore formed between a second conveyor channel and the combustion chamber, the second bore hydraulically decoupling the combustion chamber from the second conveyor channel.

The hydraulically decoupling in the first bore may comprise decelerating and accelerating the first fuel component, and the hydraulically decoupling in the second bore may comprise decelerating and accelerating the second fuel component.

The combustion chamber may be structured and arranged in a liquid-fueled rocket engine, and the first bore may be arranged substantially parallel and adjacent to the second bore.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein FIG. 1 shows a first embodiment of the injection device according to the invention; and FIG. 2 shows a modified embodiment of the injection device according to the invention.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

FIG. 1 shows a first embodiment of an injection device 1 according to the invention for a combustion chamber 2 of a liquid-fueled rocket engine. The combustion chamber 2 has a combustion space 20 with a wall 22. A part of the wall 22 is formed by an injection plate 10 of the injection device 1. The injection plate 10 determines the wall on the combustion chamber side of an injection head 12 contained by the injection device 1. On its side facing away from the injection plate 10, the injection head 12 at least partially borders a first conveyor channel 3 of a fuel conveyor system for a first fuel component. At least one further wall section of the injection head 12 facing away from the injection plate 10 borders a second conveyor channel 4 of a conveyor system for a second fuel component.

A first opening 30 is provided in the injection head 12. The first opening 30 connects the first conveyor channel 3 to the combustion chamber 20. The first opening 30 forms a first injection nozzle 32 for the first fuel component. The first injection nozzle 32 has an entry bore 33 discharging into the combustion chamber 2. The entry bore 33 extends over most of the length of the first opening 30.

On its end facing away from (e.g., opposite) the discharge 31 into the combustion chamber 2, the first injection nozzle 32 has an orifice bore 34 running coaxially with the entry bore 33. The diameter of the orifice bore 34 is smaller than the diameter of the entry bore 33. A conical bore section 35 tapering towards the orifice bore 34 is provided between the entry bore 33 and the orifice bore 34. The orifice bore 34 is provided with a chamfer 36 in the area of its discharge 37 into the first conveyor channel 3. The chamfer 36 enlarges its diameter from the orifice bore 34 towards the discharge 37.

The first fuel component flows in the direction of the arrow "S" from the first conveyor channel 3 through the first opening 30 into the combustion chamber 2. The first fuel component is accelerated while passing through the orifice bore 34 so that the static pressure of the first fuel component decreases in this area. When exiting from the orifice bore 34, the first fuel component undergoes a pressure recovery and, thus, a reduction of the flow speed in the area of the conical bore section 35 due to the increase in diameter in the flow direction. The size of the pressure recovery and, thus, of the flow speed of the first fuel component in the entry bore 33 depends on its diameter. The first fuel component leaves the entry bore 33 at this flow speed in the area of its discharge 31 into the combustion space 20 of the combustion chamber 2.

In embodiments, the geometries of the individual sections of the first opening 36 (i.e., the respective length and the respective diameter of the entry bore 33, of the conical bore section 35, and of the orifice bore 34) are designed such that no flow separation of the first fuel component occurs while flowing through the first injection nozzle 32 from the respective bore wall.

A second opening 40 is provided in the injection head 12 parallel to the first opening 30. The second opening connects the second conveyor channel 4 to the combustion chamber 20. The second opening 40 forms a second injection nozzle 42 for the second fuel component. The second injection nozzle 42 has an entry bore 43 discharging into the combustion chamber 2. The entry bore 43 extends over most of the length of the second opening 40.

On its end facing away from (e.g., opposite) the discharge 41 into the combustion chamber 2, the second injection nozzle 42 has an orifice bore 44 running coaxially with the entry bore 43. The diameter of the orifice bore 44 is smaller than the diameter of the entry bore 43. A conical bore section 45 tapering towards the orifice bore 44 is provided between the entry bore 43 and the orifice bore 44. The orifice bore 44 is provided, in the area of its discharge 47 into the second conveyor channel 4, with a chamfer 46 which enlarges its diameter from the orifice bore 44 towards the discharge 47.

The second fuel component flows in the direction of the arrow "S" from the second conveyor channel 4 through the second opening 40 into the combustion chamber 2. The second fuel component is accelerated when passing through the orifice bore 44 so that the static pressure of the second fuel component decreases in this area. Upon exit through the orifice bore 44, the second fuel component undergoes a pressure recovery and, thus, a reduction of the flow speed in the area of the conical bore section 45 due to the diameter enlargement in the flow direction. The size of the pressure recovery and, thus, of the flow speed of the second fuel component in the entry bore 43 depends on its diameter. The second fuel component leaves the entry bore 43 at this flow speed in the area of its discharge 41 into the combustion space 20 of the combustion chamber 2.

In embodiments, the geometries of the individual sections of the second opening (i.e., the respective length and the respective diameter of the entry bore 43, of the conical bore section 45, and of the orifice bore 44) are designed such that no flow separation of the second fuel component occurs while flowing through the second injection nozzle 42 from the respective bore wall.

FIG. 2 shows an alternative embodiment of the injection device shown in FIG. 1. The injection device 1' shown in FIG. 2 is modified in the area of the respective discharges 37, 47 of the orifice bore 34 of the first opening 30 and the orifice bore 44 of the second opening 40.

Instead of the chamfer 36 provided in the example of FIG. 1, a short cylindrical discharge bore section 38 is provided in the area of the discharge 37 of the first opening 30' into the first conveyor channel 3. This section 38 transitions into the orifice bore 34 by way of a conical bore section 39 tapering towards the orifice bore 34. The diameter of the cylindrical discharge bore section 38 is greater than the diameter of the orifice bore 34 and greater than the diameter of the entry bore 33. This embodiment of the inlet from the first conveyor channel 3 into the orifice bore 34 serves, like the conical bore section 35, to prevent jet detachments and cavitation and supercavitation in the bores 34, 35 and 33 following in the flow direction. The chamfer 36 provided in the embodiment of FIG. 1 also effects such prevention to an extent.

Instead of the chamfer 46 provided in the example of FIG. 1, a short cylindrical discharge bore section 48 is provided in the area of the discharge 47 of the second opening 40' into the second conveyor channel 4. This section 48 transitions into the orifice bore 44 by way of a conical bore section 49 tapering towards the orifice bore 44. The diameter of the cylindrical discharge bore section 48 is greater than the diameter of the orifice bore 44 and greater than the diameter of the entry bore 43. This embodiment of the inlet from the second conveyor channel 4 into the orifice bore 44 serves, like the conical bore section 45, to prevent jet detachments and cavitation and supercavitation in the bores 44, 45 and 43 following in the flow direction. The chamfer 47 provided in the example of FIG. 1 also effects such prevention to an extent.

FIG. 2 further shows that the first injection nozzle 32 and the second injection nozzle 42 are composed of tubes 14, 16 inserted in the injection head 12'. This variant can also be provided with the openings shown in FIG. 1.

Reference numbers in the claims, the specification and the drawings are only to make the invention more intelligible and are not to limit its scope.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE NUMBERS

| | |
|---|---|
| 1 | Injection device |
| 1' | Injection device |
| 2 | Combustion chamber |
| 3 | First conveyor channel |
| 4 | Second conveyor channel |
| 10 | Injection plate |
| 12 | Injection head |
| 12' | Injection head |
| 14 | Tube |
| 16 | Tube |
| 20 | Combustion space |
| 22 | Wall |
| 30 | First opening |
| 30' | First opening |
| 31 | Discharge |
| 31' | Discharge |
| 32 | First injection nozzle |
| 33 | Entry bore |
| 34 | Orifice bore |
| 35 | Conical bore section |
| 36 | Chamfer |
| 37 | Discharge |
| 38 | Cylindrical discharge bore section |
| 39 | Conical bore section |
| 40 | Second opening |
| 40' | Second opening |
| 41 | Discharge |
| 41' | Discharge |
| 42 | Second injection nozzle |
| 43 | Entry bore |
| 44 | Orifice bore |
| 45 | Conical bore section |
| 46 | Chamfer |
| 47 | Discharge |
| 48 | Cylindrical discharge bore section |
| 49 | Conical bore section |

What is claimed:

1. An injection device for a combustion chamber of a liquid-fueled engine, comprising:
   a first bore structured and arranged to convey a first fuel component from a first conveyor channel to the combustion chamber; and
   a second bore structured and arranged to convey a second fuel component from a second conveyor channel to the combustion chamber, wherein:
   the first bore comprises a first converging portion adjacent a first diverging portion, which is remote from a first discharge into the combustion chamber,
   the second bore comprises a second converging portion adjacent a second diverging portion, which is remote from a second discharge into the combustion chamber,
   a longitudinal axis of the first bore is arranged substantially parallel and adjacent to a longitudinal axis of the second bore, and
   the first fuel component is a different composition than that of the second fuel component.

2. The injection device of claim 1, wherein:
   the first converging portion comprises a first chamfer and a first orifice bore, and
   the second converging portion comprises a second chamfer and a second orifice bore.

3. The injection device of claim 1, wherein:
   the first converging portion comprises a first bore section, a first conical section, and a first orifice bore; and
   the second converging portion comprises a second bore section, a second conical section, and a second orifice bore.

4. The injection device of claim 1, wherein one of:
   the first fuel component is fuel and the second fuel component is oxidizer, and
   the first fuel component is oxidizer and the second fuel component is fuel.

5. The injection device of claim 1, wherein the first bore has a first longitudinal length and the second bore has a second longitudinal length, and wherein the first longitudinal length is greater than the second longitudinal length.

6. An injection device for a combustion chamber of a liquid-fueled engine, comprising:
   a first bore structured and arranged to convey a first fuel component from a first conveyor channel to the combustion chamber; and
   a second bore structured and arranged to convey a second fuel component from a second conveyor channel to the combustion chamber, wherein:
   the first bore comprises at least one first injection nozzle including:
   a first entry bore having a first discharge into the combustion chamber; and
   a first orifice bore, having a cross-sectional dimension less than or equal to that of the first entry bore, coaxially arranged with the first entry bore and remote from the first discharge;
   the second bore comprises at least one second injection nozzle including:
   a second entry bore having a second discharge into the combustion chamber; and a second orifice bore, having a cross-sectional dimension less than or equal to that of the second entry bore, coaxially arranged with the second entry bore and remote from the second discharge, a longitudinal axis of the first bore is arranged substantially parallel and adjacent to a longitudinal axis of the second bore, and the first fuel component is a different composition than that of the second fuel component.

7. The injection device of claim 6, wherein:

the first bore further comprises a first cylindrical discharge bore section transitioning by way of a first converging conical bore section tapering towards the first orifice bore, wherein a diameter of the first cylindrical discharge bore section is greater than the diameter of the first orifice bore and greater than the diameter of the first entry bore; and the second bore further comprises a second cylindrical discharge bore section transitioning by way of a second converging conical bore section tapering towards the second orifice bore, wherein a diameter of the second cylindrical discharge bore section is greater than the diameter of the second orifice bore and greater than the diameter of the second entry bore.

8. The injection device of claim 7, wherein the first cylindrical discharge bore section and the first converging conical bore section tapering towards the first orifice bore are structured and arranged to prevent at least one of jet detachments, cavitation and supercavitation in the first orifice bore, the first entry bore and a first diverging conical bore section.

9. The injection device of claim 7, wherein the second cylindrical discharge bore section and the second converging conical bore section tapering towards the second orifice bore are structured and arranged to prevent at least one of jet detachments, cavitation and supercavitation in the second orifice bore, the second entry bore and a second diverging conical bore section.

10. The injection device of claim 6, wherein:

at least one of the first entry bore and the first orifice bore is composed of a channel with a substantially circular cross section, and at least one of the second entry bore and the second orifice bore is composed of a second channel with a substantially circular cross section.

11. The injection device of claim 6, wherein one of:

the first fuel component is fuel and the second fuel component is oxidizer, and the first fuel component is oxidizer and the second fuel component is fuel.

12. The injection device of claim 6, wherein the first entry bore has a first longitudinal length and the second entry bore has a second longitudinal length, and wherein the first longitudinal length is greater than the second longitudinal length.

* * * * *